United States Patent
Ikeda

(10) Patent No.: US 8,314,919 B2
(45) Date of Patent: Nov. 20, 2012

(54) LIQUID CRYSTAL DISPLAY DEVICE AND METHOD OF MANUFACTURING SAME

(75) Inventor: Masaki Ikeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 227 days.

(21) Appl. No.: 12/671,039

(22) PCT Filed: May 1, 2008

(86) PCT No.: PCT/JP2008/058346
§ 371 (c)(1),
(2), (4) Date: Jan. 28, 2010

(87) PCT Pub. No.: WO2009/016867
PCT Pub. Date: Feb. 5, 2009

(65) Prior Publication Data
US 2010/0201914 A1    Aug. 12, 2010

(30) Foreign Application Priority Data
Aug. 1, 2007  (JP) ............... 2007-200700

(51) Int. Cl.
*G02F 1/13* (2006.01)
(52) U.S. Cl. .............................. 349/192; 349/62
(58) Field of Classification Search ............... None
See application file for complete search history.

(56) References Cited

U.S. PATENT DOCUMENTS

| | | | |
|---|---|---|---|
| 4,879,451 A * | 11/1989 | Gart | 219/121.69 |
| 5,280,374 A | 1/1994 | Nakai et al. | |
| 5,601,966 A | 2/1997 | Kumar et al. | |
| 5,614,353 A | 3/1997 | Kumar et al. | |
| 5,652,083 A | 7/1997 | Kumar et al. | |
| 5,715,022 A * | 2/1998 | Takamatsu et al. | 348/759 |
| 2005/0044895 A1 | 3/2005 | Yamate et al. | |
| 2007/0035678 A1* | 2/2007 | Yoo et al. | 349/54 |

FOREIGN PATENT DOCUMENTS

| | | |
|---|---|---|
| JP | 4-116520 A | 4/1992 |
| JP | 4-301617 A | 10/1992 |
| JP | 5-19243 A | 1/1993 |
| JP | 10-62796 A | 3/1998 |
| JP | 2001-5167 A | 1/2001 |
| JP | 2004-2056 A | 1/2004 |
| JP | 2005-189360 A | 7/2005 |
| JP | 2005-345602 A | 12/2005 |
| RU | 2 141 698 C1 | 11/1999 |

OTHER PUBLICATIONS

Machine translation of jp 2003-073148. Mar. 12, 2003.*
Xiongwei et al., "Femtosecond laser-induced darkening in optical glasses," Optical Materials, vol. 20, 2002, pp. 183-187.

* cited by examiner

*Primary Examiner* — Lucy Chien
(74) *Attorney, Agent, or Firm* — Birch, Stewart, Kolasch & Birch, LLP

(57) ABSTRACT

A liquid crystal display device 10 of the present invention includes a liquid crystal panel 11 and a lighting device 12. The liquid crystal panel 11 has a liquid crystal layer 50 between a pair of glass substrates 31 and 41. The lighting device 12 supplies illumination light to the liquid crystal panel 11. The glass substrate 31 at least has a colored portion including a nonbridging oxygen hole center in an area that can block light to luminance defect area X that is a possible cause of a luminance point defect.

6 Claims, 6 Drawing Sheets

LIQUID CRYSTAL DISPLAY DEVICE AND METHOD OF MANUFACTURING SAME

TECHNICAL FIELD

The present invention relates to a liquid crystal display device and a method of manufacturing the liquid crystal display device.

BACKGROUND ART

The following is an example of method of manufacturing a liquid crystal display device. Switching elements (e.g., TFT) and pixel electrodes are arranged on one of glass substrates provided in a pair, and counter electrodes are arranged on the other glass substrate. Those glass substrates are then bonded with spacers between them. Liquid crystal is disposed between the glass substrates so as to form a liquid crystal layer. Polarizing plates are attached to respective surfaces of the glass substrates, and then a liquid crystal panel is produced. A lighting device that has a plurality of cold cathode tubes as light source is mounted to the liquid crystal panel.

In such a production process of liquid crystal display device, a defect detection using various inspections may be performed at a predetermined point. In an inspection after a liquid crystal layer is formed, for example, a pair of test polarizing plates is arranged so as to sandwich both glass substrates. A test backlight is turned on, and a switching element is driven to detect display defects.

In such an inspection process, if a foreign substance is present in the liquid crystal layer, light is irregularly reflected by it, which may create bright spots on black display. These spots would be detected as luminance point defects, and greatly degrade the display quality and yield in production.

A method of compensating for a luminance point defect as shown in Patent Document 1 is known, for example. In Patent Document 1, a processed concave portion is formed near a surface of a transparent substrate that is located in a travel path of light that illuminates a pixel element in which a luminance point defect is present and on an incidence side. Sides and bottom of the processed concave portion are finished by surface-roughening so as to form a light scattering region.

Patent Document 1: JP-A-04-301617

DISCLOSURE OF THE PRESENT INVENTION

Problem to be Solved by the Invention

Because the processed concave portion is formed on the glass substrate, strength of the glass substrate decreases as a depth of the processed concave portion increases. If a shallow processed concave portion is formed to increase the strength of the glass substrate, a gap with a certain distance will be created between the processed concave portion and a defective portion. Such a gap will result in failure to compensate for the luminance point defect. This is because light that has entered from a surface outside the processed concave portion (i.e. non-processed portion) to the glass substrate could reach the defective portion via the gap. As a result, some luminance point defects remain.

The present invention was made in view of the foregoing circumstances, and an object thereof is to certainly make luminance point defects invisible and provide a liquid crystal display device having high display quality. Another object of the present invention is to provide a method of manufacturing a liquid crystal display device including a process of properly compensating for a luminance point defect that is present in the liquid crystal display device.

Means for Solving the Problem

To solve the above-described problem, a liquid crystal display device of the present invention has the following feature. The liquid crystal display device includes a liquid crystal panel, between which a liquid crystal layer is formed, and a lighting device for providing light for the liquid crystal panel. On at least one of the glass substrates, a colored portion having a nonbridging oxygen hole center is formed in an area that can block light to a luminance point defect occurrence area, which may be a cause of a luminance point defect.

The inventor of the present invention has been examining a method of compensating for a luminance point defect without degrading strength of glass substrate, that is, without forming a concave portion on the glass substrate. In the examination, he focused on a color center that reduces a transmittance of visible light that passes through a glass. The color center in the glass includes peroxiradical ($\equiv$Si—O—O* structure), oxygen defect center ($\equiv$Si—Si$\equiv$ and —O—Si**—O— structure) and nonbridging oxygen hole center ($\equiv$Si—O* structure). With regard to the nonbridging oxygen hole center, an electron is released from a silicon oxide compound (nonbridging oxygen) by simply exposing a glass to light. As a result, a molecular binding defect, which is called a nonbridging oxygen hole center, is created. Because the nonbridging oxygen hole center absorbs visible light, a glass is generally colored in brown.

The liquid crystal display device of the present invention includes a nonbridging oxygen hole center formed in an area that can block light to a luminance point defect occurrence area. According to this construction, the area in which nonbridging oxygen hole center is formed is colored and has a light blocking effect. Therefore, a luminance point defect occurrence area is not viewed as a luminance point defect and the liquid crystal display device having high display quality is provided. Furthermore, the nonbridging oxygen hole center is less likely to degrade the strength of the glass substrate, and therefore forming the nonbridging oxygen benter is a favorable method of compensating for a luminance point defect without degrading strength of glass substrate.

BEST MODE FOR CARRYING OUT THE INVENTION

An embodiment of the present invention will be explained with reference to FIGS. 1 to 6.

Figure 1:
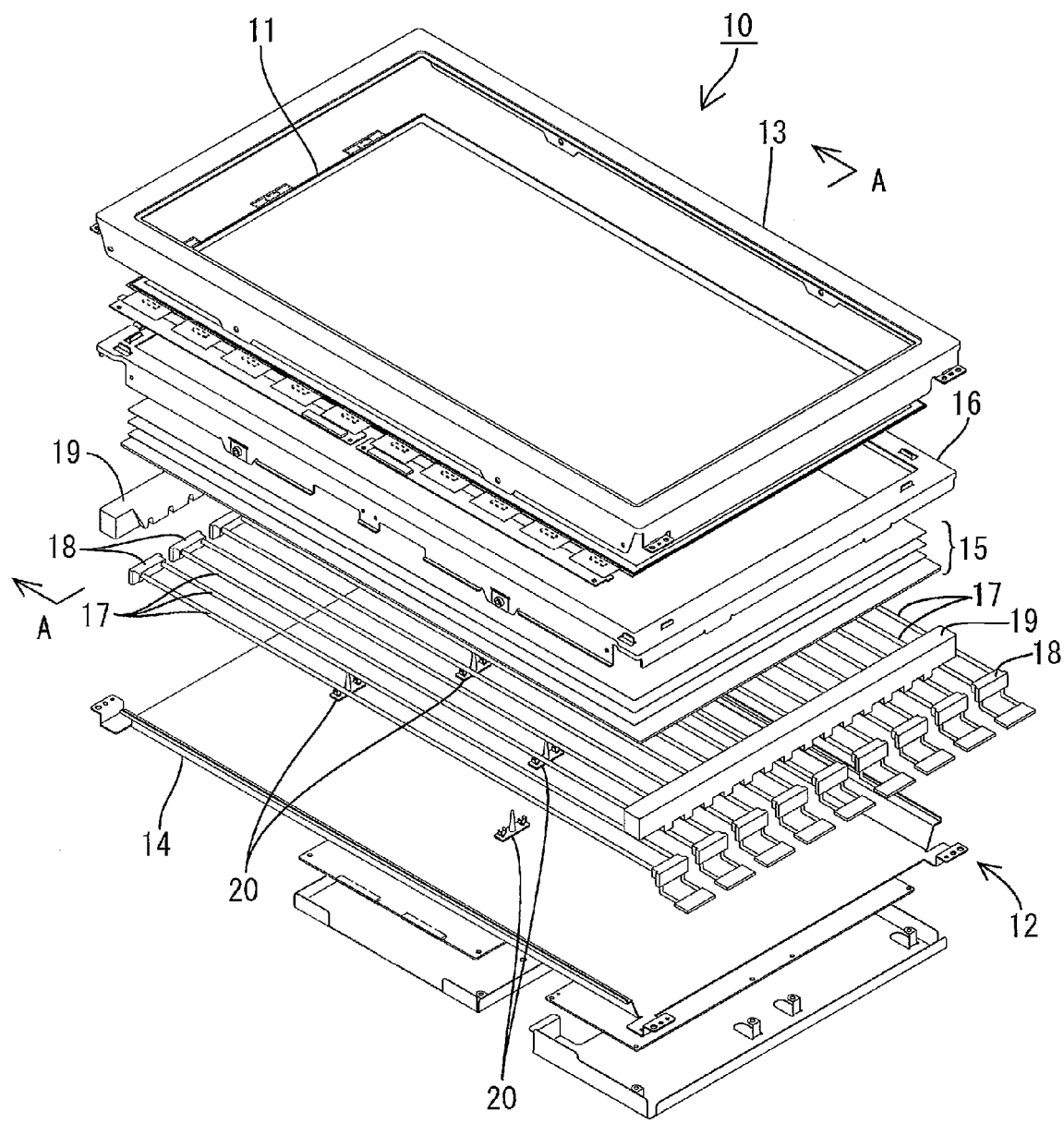
FIG. 1 is a perspective view showing a general construction of a liquid crystal display device according to an embodiment of the present invention.
Figure 2:
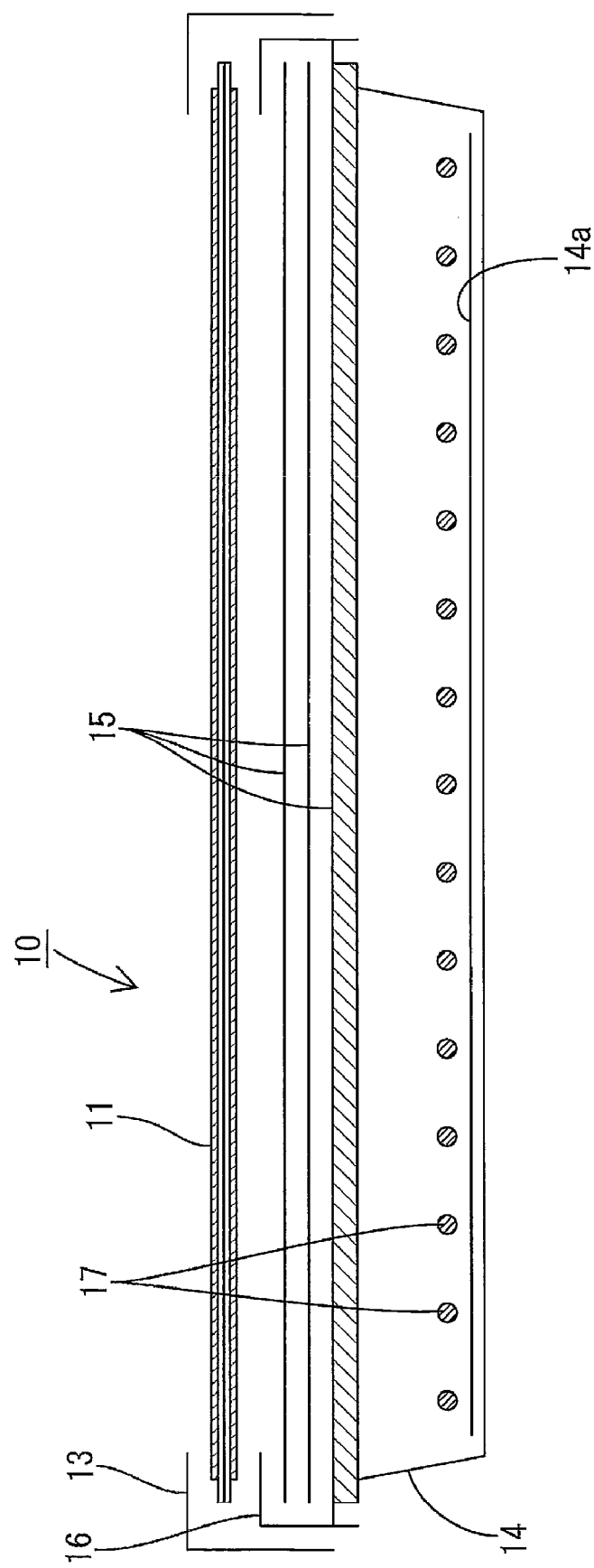
FIG. 2 is a cross-sectional view of the liquid crystal display device shown in FIG. 1 along the line A-A.
Figure 3:
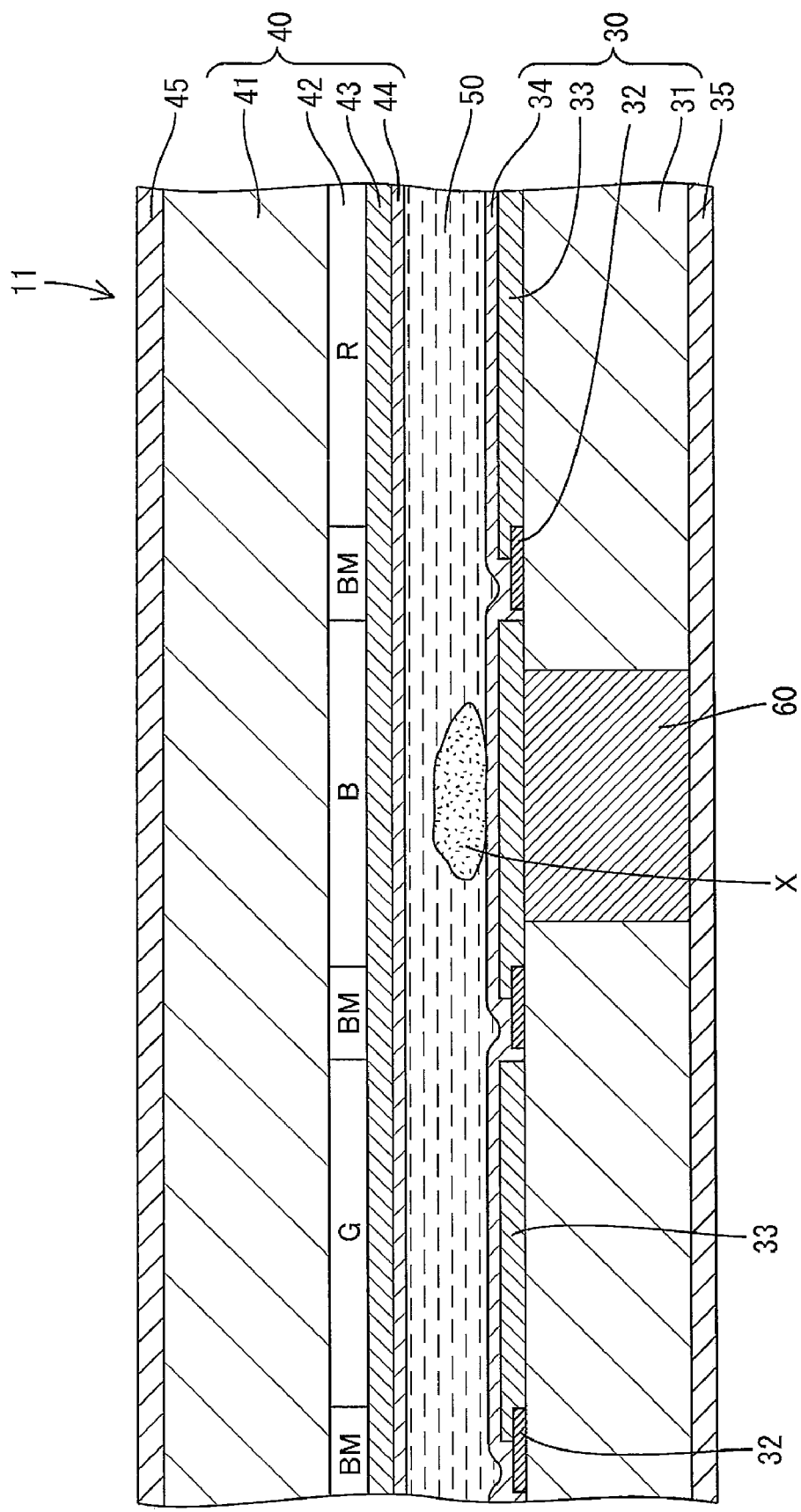
FIG. 3 is a cross-sectional view of a main part of a liquid crystal panel included in the liquid crystal display device shown in FIG. 1.
Figure 4:
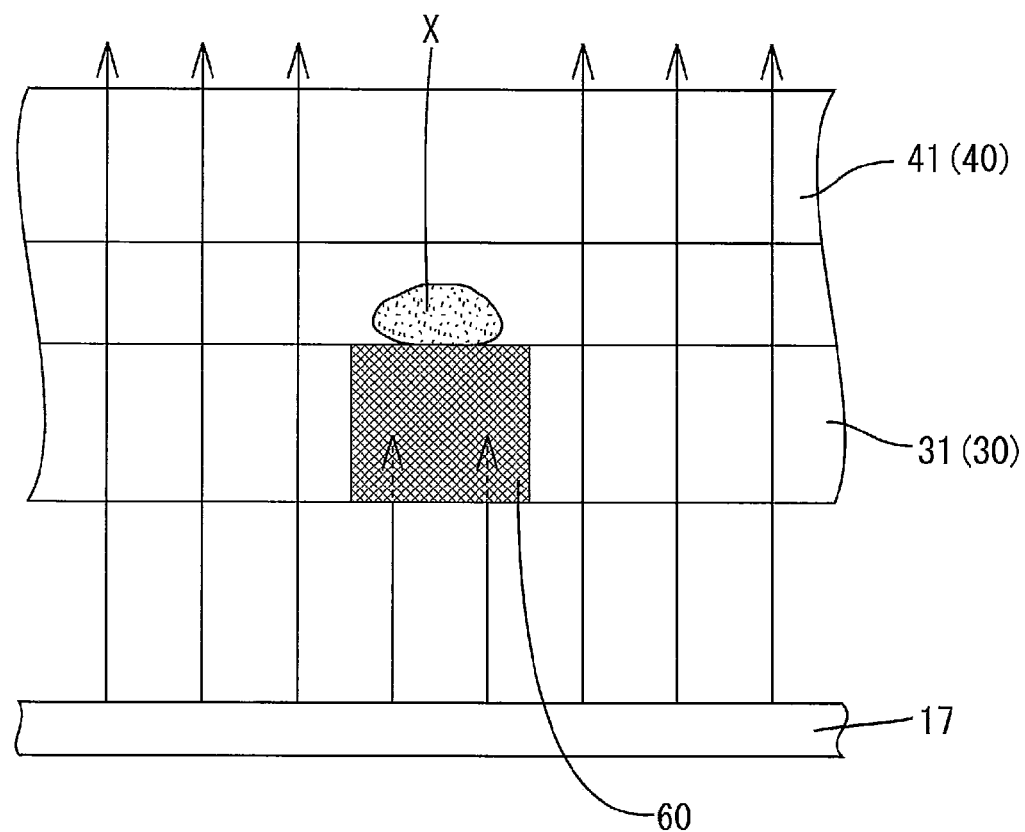
FIG. 4 is an explanatory view showing operational effect of the liquid crystal display device according to an embodiment of the present invention.
Figure 5:
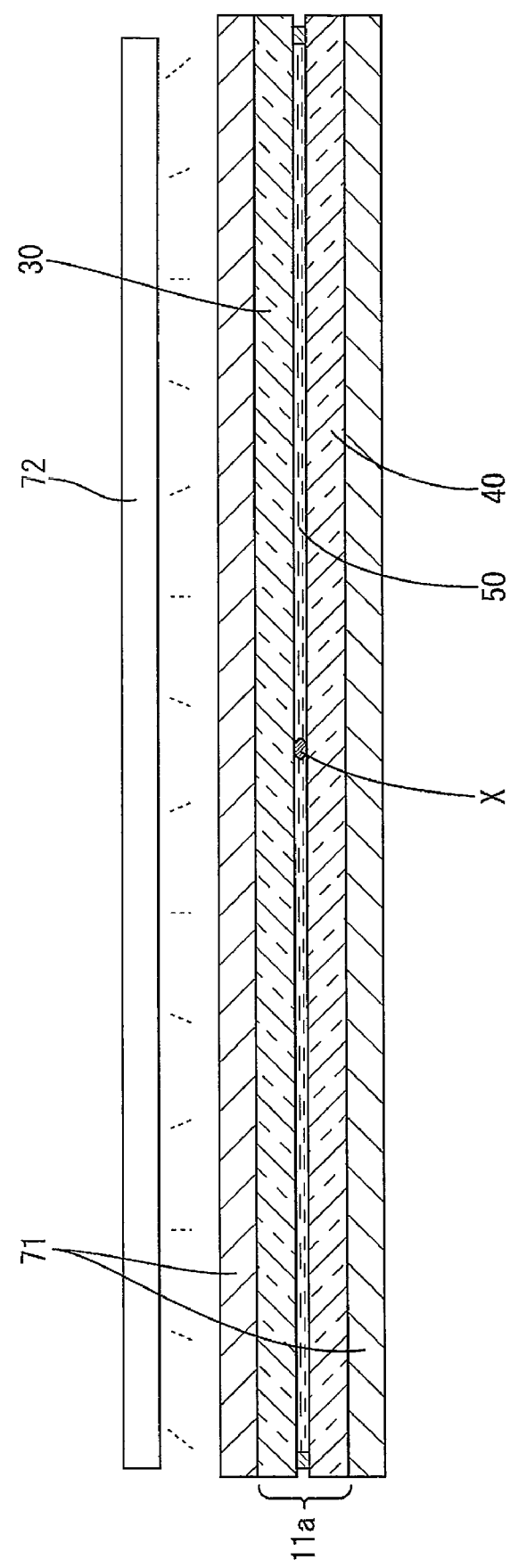
FIG. 5 is an explanatory view showing an embodiment of lighting inspection process for an inspection liquid crystal panel.
Figure 6:
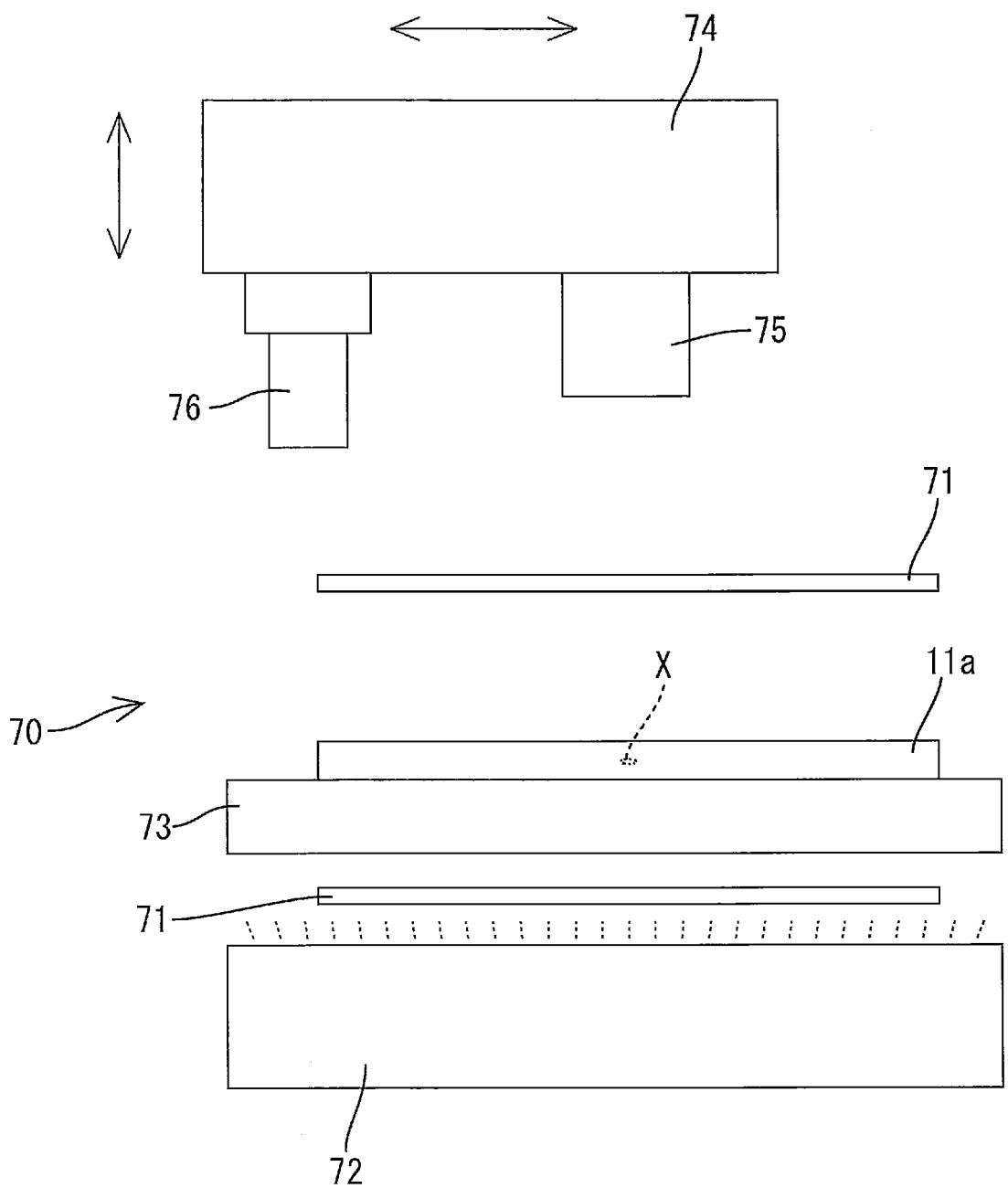
FIG. 6 is a side view showing a general construction of a luminance point defect compensation device.

FIG. 1 is a perspective view showing a general construction of a liquid crystal display device according to this embodiment. FIG. 2 is a cross-sectional view of the liquid crystal display device shown in FIG. 1 cut with an A-A line. FIG. 3 is a cross-sectional view of a main part of a liquid crystal panel included in the liquid crystal display device shown in FIG. 1. FIG. 4 is an explanatory view showing operational effect of the liquid crystal display device according to this embodiment. FIG. 5 is an explanatory view showing an embodiment of lighting inspection process for an inspection liquid crystal panel. FIG. 6 is a side view showing a general construction of a luminance point defect compensation device.

An overall construction of a liquid crystal display device 10 according to the present embodiment will be explained. The liquid crystal display device 10, as shown in FIGS. 1 and 2, includes a liquid crystal panel 11 having a rectangular shape and a backlight device (lighting device) 12, which is an external light source. The liquid crystal panel 11 and the backlight device 12 are integrally held by a bezel 13 and the like. The backlight device 12 is a so-called direct-light type back light device. It includes a plurality of light sources (cold cathode tubes 17 are used for high-pressure discharge tubes here) arranged directly behind a panel surface (display surface) of the liquid crystal panel 11, which will be explained later, and along the panel surface.

The backlight device 12 includes a backlight chassis (chassis) 14, a plurality of optical members 15 and a frame 16. The backlight chassis 14 is formed in a substantially box-shape having an opening on a top. The optical members 15 are arranged so as to cover the opening of the backlight chassis 14. The optical members 15 include a diffuser plate, a diffusing sheet, a lens sheet and a reflection type polarizing plate, arranged in this order from the lower side of the drawings. The frame 16 holds the optical members 15 to the backlight chassis 14. Furthermore, cold cathode tubes 17, resin holders 18, lamp holders 19 and lamp clips 20 are installed in the backlight chassis 14. The resin holders 18 hold ends of the cold cathode tubes 17. The lamp holders 19 integrally cover ends of cold cathode tubes 17 and the holders 18. The lamp clips 20 hold the cold cathode tubes 17 to the backlight chassis 14. A light emitting side of the backlight device 12 is on the optical member 15 side rather than the cold cathode tube 17 side.

Each cold cathode tube 17 has an elongated tubular shape. A plurality of cold cathode tubes 17 (18 tubes in FIG. 1) is housed in the backlight chassis 14 such that the longitudinal direction (i.e., axial direction) of each cold cathode tube 17 matches the longitudinal direction of the backlight chassis 14. The lamp clips 20 for mounting the cold cathode tubes 17 to the backlight chassis 14 function as a clip-type holding member for light sources. They are made of synthetic resin (e.g., polycarbonate).

A light reflecting surface is formed on an inner surface (i.e., on a light source side) of the backlight chassis 14 with a light reflecting sheet 14a. The backlight chassis 14 having the light reflecting sheet 14a can reflect light emitted from each cold cathode tube 17 toward the optical members 15, which includes the diffuser plate. The light reflecting sheet 14a is a resin sheet having light reflectivity, for example.

Next, the liquid crystal panel 11 will be explained. The liquid crystal panel 11, as shown in FIG. 3, includes a pair of boards 30, 40 bounded with a predetermined gap between them and liquid crystal interposed between those boards 30, 40. The liquid crystal forms a liquid crystal layer 50.

The board 30 is a component board including a glass substrate 31, TFTs (Thin Film Transistor) 32, pixel electrodes 33 and an alignment film 34. The TFTs 31, which are semiconductor components, are formed on a liquid crystal layer 50 side of the glass substrate 31. The pixel electrodes 33 are electrically connected with the TFTs 32. The alignment film 34 is formed on the liquid crystal layer 50 side of the TFTs 32 and pixel electrodes 33. On the side of the glass substrate 31 not facing the liquid crystal layer 50, a polarizing plate 45 is provided. The board 30 (glass substrate 31) is arranged on a backlight device 12 side.

The substrate 40 is an opposite substrate including a glass substrate 41, a color filter 42, an counter electrode 43, and alignment film 44. The color filter 42 is formed on the liquid crystal layer 50 side of the glass substrate 41 such that colored portions of R (red), G (green), B (blue) and the like are formed in a predetermined sequence. The counter electrode 43 is formed on the liquid crystal 50 side of the color filter 42. The alignment film 44 is formed on the liquid crystal 50 side of the counter electrode 43. On the side of the glass substrate 41 not facing the liquid crystal layer 50, a polarizing plate 45 is provided.

The above-described glass substrates 31, 41 contain less than 1.0 wt % of sodium (Na) as a trace containing element, which is calculated by taking each containing element as an oxide. Some sodium (Na) exists in the state of compound linked to nonbridging oxygen in a glass structure ($\equiv$Si—ONa).

The present embodiment includes means of blocking light to a foreign substance (luminance point defect occurrence area) that has entered into the liquid crystal layer 50 and is a possible cause of a luminance point defect, as shown in FIGS. 3 and 4. More specifically, in the glass substrate 31 of the board 30, a colored portion 60 in a dark brown color is formed in an area that overlaps a shadow of the foreign substance X when the area and the shadow are looked in a plan view. The colored portion 60 is formed from one side to another in a thickness direction of the substrate.

The colored portion 60 has nonbridging oxygen hole center ($\equiv$Si—O*) in its glass structure. It is in dark brown so as to have absorbency for visible light. Namely, light emitted from the cold cathode tube 17 is absorbed by the nonbridging oxygen hole center (i.e., the colored portion 60). Thus, the light is blocked there and does not reach the foreign substance X (See FIG. 4).

According to the liquid crystal display device 10 of the present embodiment, the colored portion 60, which includes a nonbridging oxygen hole center, is formed in the glass substrate 31 in an area that can block light to the foreign substance (luminance point defect occurrence area) X. The foreign substance is a possible cause of a luminance point defect. The colored portion 60 blocks illumination light, and illumination light does not reach the foreign substance X. Thus, the luminance point defect is not viewed and high display quality is provided.

In the background art, a concave portion is formed on a glass substrate to block (or reduce) light for the above-described purpose. Therefore, strength of glass substrate may be degraded. The present embodiment uses a nonbridging oxygen hole center to block illumination light, which is less likely to affect on the strength of glass substrate. Thus, strength degradation of glass substrate needs not be concerned.

In the present embodiment, the colored portion 60 is formed from one side to another of the glass substrate 31.

In this case, a remaining portion, in which a colored portion is not formed, does not exist between the colored portion 60 and the foreign substance X. This restricts light emitted from the cold cathode tube from traveling around the colored portion 60 and reaching the foreign substance X when passing through the glass substrate. As a result, the luminance point defect is not viewed and high display quality is provided.

In the present embodiment, the glass substrate 31 in which the colored portion is formed contains sodium (Na).

An electron released from the nonbridging oxygen is trapped by sodium (Na), and the electron does not return to the nonbridging oxygen. Therefore, nonbridging oxygen hole center is favorably formed.

In the present embodiment, the colored portion 60 is formed in the glass substrate 31 that is arranged on the backlight device 12 side.

By forming the colored portion 60 on the backlight device 12 side (i.e., a side far from the display surface), the colored portion 60 is less likely to be viewed.

Next, a method of manufacturing the liquid crystal device 19 will be explained, mainly that includes a compensation process.

First, the glass substrate 31 is prepared, and the TFTs 32 and the pixel electrodes 33 are formed on the glass substrate 31. An alignment film is formed on the TFTs 31 and the pixel electrodes 33. These steps produce the board 30, which is a component board.

Next, another glass substrate, that is, the glass substrate 41 is prepared, and the color filter 42 is formed on the glass substrate 41. The counter electrode 43 is formed on the color filter 42, and an alignment film 44 is formed on the counter electrode 43. These steps produce the board 40, which is an opposite board.

The above-described glass substrates 31, 41 contain less than 1.0 wt % of sodium (Na) as a trace containing element (weight of each element is calculated in the form of oxide). Some sodium (Na) elements contained in the glass substrates 31, 41 exist in a state of bonding with nonbridging oxygen ($\equiv$Si—ONa) in the glass structure.

The boards 30 and 40 are bonded with a predetermined gap between them, and liquid crystal is interposed in the gap so as to form the liquid crystal layer 50. The polarizing plates 35, 45 are arranged on surfaces of the respective boards 30, 40 on far sides from the liquid crystal layer 50. This completes manufacturing of the liquid crystal panel 11 (See FIG. 3). In an assembly process of the liquid crystal panel 11 and the backlight device 12, which will be explained later, the board 30 (glass substrate 31) is arranged on the backlight device 12 side.

In the above-described manufacturing process, an illumination inspection for detecting display defects is performed after the liquid crystal layer 50 is formed. The liquid crystal panel in this manufacturing process will be referred to as an inspection liquid crystal panel 11a hereinafter.

More specifically, a pair of polarizing plates 71 for inspection is arranged so as to sandwich the boards 30, 40 of the inspection liquid crystal panel 11a, as shown in FIG. 5. A backlight 72 for inspection is turned on. Electrical lines formed on the glass substrate 31 are connected to a test circuit and appropriate electrical signals are fed to respective lines to drive the TFTs 32. Display conditions created by controlling alignment of the liquid crystal that forms the liquid crystal layer 50 are inspected through image processing or visually by an inspector.

In the inspection, a bright spot may be viewed on black display and may be detected as a luminance point defect. The luminance point defect may result from irregular reflection of light that strikes a foreign substance X in the liquid crystal layer 50. When such a luminance point defect is detected, a luminance point defect compensation process, which will be explained next, will be performed for compensating for the luminance point defect. Possible causes of the foreign substance entering the liquid crystal layer 50 include that the foreign substance has adhered to a surface of the board 30, 40 on the liquid crystal layer 50 side before enclosing the liquid crystal, or it has been entered in the liquid crystal.

The luminance point defect compensation process includes a process for specifying a compensation area that can block light to the foreign substance X in the glass substrate 31, and a process for forming the colored portion 60 by applying laser with a femtosecond order or shorter pulse width to the compensation area.

In the luminance point defect compensation process, a luminance point defect compensation device 70 shown in FIG. 6 is used for compensating for a luminance point defect. The luminance point defect compensation device 70 has a stage 73 (not shown in FIG. 5), a pair of polarizing plates 71 for inspection, a backlight 72 for inspection and an XYZ driving section 74. The stage 73 is provided for placing the inspection liquid crystal panel 11a, which may be a compensation object. The polarizing plates 71 are arranged so as to sandwich the stage 73. The XYZ driving section 74 moves in horizontal and vertical directions of the stage 73. The XYZ driving section 74 has a CCD camera 75 and a laser emitting section 76 arranged in predetermined relative positions. The CCD camera 75 is provided for capturing the foreign substance X and its surrounding area. The laser emitting section 76 outputs a laser beam for forming the colored portion 60. The stage 73 is made of glass so as to transmit light emitted from the backlight 72.

With the luminance point defect compensation device 70, a compensation point is specified so as to block light to the foreign substance X. First, the inspection liquid crystal panel 11a, which may require compensation, is placed in the predetermined position on the stage 73. It should be set such that the glass substrate 31 is on the top. Next, the backlight 72 is turned on to put the inspection liquid crystal panel 11a in a black display state. The XYZ driving section 74 is moved in the horizontal direction of the stage 73 to capture display conditions by the CCD camera 75. The captured display conditions are processed by image processing to provide information on location and size of the foreign substance X. An area in the glass substrate 31 that can block light to the foreign substance X is specified based on the information.

After the above process, the process for forming the colored portion 60 in the specified compensation area of the glass substrate 31 will be performed. In this process, the colored portion 60 is formed by applying a beam of femtosecond laser with a $10^{-13}$ second-order pulse width. More specifically, the XYZ driving section 74 is moved based on the information on the area that can block light to the foreign substance X. The laser emitting section 76 is set directly above the area, and the laser beam is applied to the area. In the present embodiment, the laser beam is applied in the following condition: 350 nm wavelength, 100 fs pulse width, 1 kHz repeating frequency, 1 mJ pulse energy and 1 W output.

When the laser beam is applied to the glass substrate 31 that is capable of light transmission in the above condition, a laser focus and its nearby area are colored in dark brown. This is because a nonbridging oxygen hole center ($\equiv$Si—O*) is formed at the laser focus. The nonbridging oxygen hole center absorbs visible light and therefore the laser focus and its nearby area are colored in dark brown. By moving the laser focus continuously within the glass substrate 31, a portion in which the nonbridging oxygen hole center is formed (i.e., the colored portion 60) is formed as a continuous area along a trace of laser focuses. In the present embodiment, the colored portion 60 having the nonbridging oxygen hole center is formed from one side to another in the thickness direction of the glass substrate 31.

After the compensation for the luminance point defect is completed in the above process, a driver (not shown) that is manufactured in a different process and the backlight device 12 are assembled to the liquid crystal panel 11. The liquid crystal display device 10 is produced.

According to a method for manufacturing the liquid crystal display device 10 including the above-described compensation process of the present embodiment, the liquid crystal display device 10 in which the colored portion 60 having a nonbridging oxygen hole center is formed in an area that can block light to the foreign substance X (luminance point defect occurrence area) in the glass substrate 31 is provided. According to the liquid crystal display device 10, light emitted from the backlight device 12 is blocked by the colored portion 60 and unable to reach the foreign substance X. As a result, irregular reflection by the foreign substance X is less likely to occur and therefore a luminance point defect is not viewed.

In the present embodiment, femtosecond laser is applied at an ultraviolet wavelength to form a nonbridging oxygen hole center and then to form the colored portion 60. With the laser application, the colored portion 60 can be formed within the minimum area required for blocking light to a tiny luminance point defect occurrence area.

By using the femtosecond laser, energy is absorbed by the laser application area faster than conduction of heat created by the laser to a surrounding area of the laser application area. Thus, the surrounding area in the glass substrate is not thermally or chemically damaged, and therefore the display quality of the liquid crystal display 10 is not degraded.

Furthermore, nonlinear absorption is more likely to occur by using femtosecond laser at an ultraviolet wavelength, and thus a sufficient level of energy for creating a structural defect can be obtained.

OTHER EMBODIMENT

The present invention is not limited to the embodiment explained in the above description made with reference to the drawings. The following embodiments may be included in the technical scope of the present invention, for example.

(1) In the above embodiment, the colored portion 60 is formed from one side to another in the thickness direction of the glass substrate 31. However, the depth of the colored portion 60 can be set at any size. The colored portion 60 can be formed in a part of the glass substrate on the liquid crystal layer 50 side or in the middle of the glass substrate in the thickness direction, for example. It is preferable to form it from one side to another in the thickness direction to certainly block light.

(2) In the above embodiment, both glass substrates 31 and 41, which are included in the liquid crystal panel 11, contain sodium (Na) as a trace containing element. However, only the glass substrate 31, which is arranged on the backlight device 12 side, should contain sodium (Na) at least.

(3) In the above embodiment, the glass substrates 31 and 41, which are included in the liquid crystal panel 11, contain sodium (Na) as a trace containing element. However, if they contain potassium (K), a nonbridging oxygen hole center can be favorably formed. Only the glass substrate 31, which is arranged on the backlight device 12 side, should contain potassium (K) at least.

(4) In the above embodiment, the colored portion 60 is formed by applying femtosecond laser with a 100 fs pulse width. In a view of reducing damages to a surrounding area of the laser focus, the pulse width is smaller the better. Thus, laser with a smaller pulse width within an acceptable range for compensation efficiency can be used.

(5) In the above embodiment, the wavelength of laser used to form the colored portion 60 is 350 nm. However, a required level of energy output is only to generate nonlinear absorption with high efficiency when the laser is applied to the glass substrate 31. A preferable wavelength range is between 190 nm and 400 nm. Other conditions of laser application may be changed based on composition of the glass substrate to which the laser is applied.

(6) In the above embodiment, the process for specifying a compensation area and the process for forming the colored portion 60 by applying laser are performed by the luminance point defect compensation device 70. However, separate devices may be used for performing those processes to make a structure of each device simple.

(7) In the luminance point defect compensation device 70 of the above embodiments, the XYZ driving section 74, which includes the DDC camera 75 and the laser emitting section 76, moves in the horizontal or vertical direction of the stage 73. However, the luminance point defect compensation device 70 can have configurations such that a stage moves in the horizontal or vertical direction of a CCD camera and a laser emitting section that are fixed.

(8) In the above embodiments, the luminance defect results from the foreign substance X that has entered the liquid crystal layer 50. However, the TFTs 31 or pixel electrodes 33 may improperly operate due to short circuit and the like, and this may be a cause of the luminance defect. In such a case, the present invention can be applied.

(9) In the above embodiments, the cold cathode tubes 17 are used as light sources. However, the present invention can be applied for other types of linear light sources such as hot cathode tubes and fluorescent tubes, or dot light sources such as LEDs.

(10) The present invention can be also applied to a liquid crystal display device using switching elements other than TFTs 32.

The invention claimed is:

1. A liquid crystal display device, comprising:
a liquid crystal panel having a liquid crystal layer between a pair of glass substrates; and
a lighting device that supplies illumination light to said liquid crystal panel, wherein:
at least one of said glass substrates has a colored portion including a nonbridging oxygen hole center in an area that can block light to a luminance point defect occurrence area in which a possible cause of luminance point defect is present, and
said glass substrate in which said colored portion is formed contains at least one of sodium (Na) and potassium (K),
wherein the colored portion is formed by a applying laser with a femtosecond order or shorter pulse width at an ultraviolet wavelength to said area of the glass substrate that can block light to the luminance point defect occurrence area,
wherein the laser with a femtosecond order or shorter pulse width at an ultraviolet wavelength is applied to create a structural defect in a glass structure of said at least one of said glass substrates.

2. A liquid crystal display device as in claim 1, wherein:
said colored portion is formed from one side to another in the thickness direction of said glass substrate.

3. A method of manufacturing a liquid crystal display device having a liquid crystal panel in which a liquid crystal layer is formed between a pair of glass substrates and a lighting device that supplies illumination light to said liquid crystal panel, comprising a luminance point defect compensation process for compensating for a luminance point defect if such a luminance point defect is present, wherein:

said luminance point defect compensation process includes a compensation area specifying process and a colored portion forming process;

said compensation area specifying process specifies a compensation area that can block light to an luminance point defect occurrence area that is a cause of said luminance point defect in at least one of said substrates; and said colored portion forming process forms a colored portion by applying laser with a femtosecond order or shorter pulse width at an ultraviolet wavelength to said compensation area in said glass substrate that is specified, wherein said glass substrate in which said colored portion is formed includes at least one of elements, sodium (Na) and potassium (K), wherein said colored portion forming process colors at least one of said glass substrates by forming a nonbridging oxygen hole center, wherein said colored portion is formed by applying laser with a femtosecond order or shorter pulse width at an ultraviolet wavelength to create a structural defect in a glass structure of said glass substrate that is specified.

4. A method of manufacturing a liquid crystal display device as in claim 3, wherein said colored portion forming process forms said colored portion from one side to another in the thickness direction of said glass substrate that is arranged on a side closer to said lighting device.

5. A liquid crystal display device as in claim 1, wherein the colored portion is provided in the one of said glass substrates that is closer to the lighting device.

6. A method of manufacturing a liquid crystal display device as in claim 3, wherein said colored portion is formed in a minimum area that is required for blocking light to the luminance point defect occurrence area.

* * * * *